United States Patent [19]

Gustavson et al.

[11] 4,302,796
[45] Nov. 24, 1981

[54] LOW DRAG INTEGRATION OF LASER BEAM POINTING DEVICE INTO AIRCRAFT

[75] Inventors: Robert G. Gustavson, Los Angeles; Darold B. Cummings, Inglewood, both of Calif.

[73] Assignee: The United States of America as represented by the Secretary of the Air Force, Washington, D.C.

[21] Appl. No.: 688,460

[22] Filed: May 27, 1976

[51] Int. Cl.³ .............................................. B64D 47/02
[52] U.S. Cl. ...................................... 362/62; 89/1 A; 350/485; 362/259
[58] Field of Search ................. 350/26, 285, 301, 302; 240/7.7, 61.05; 89/37.5 C, 41 L, 1 A; 362/259, 62

[56] References Cited

U.S. PATENT DOCUMENTS

| | | | |
|---|---|---|---|
| 2,415,967 | 2/1947 | Pontius | 350/26 |
| 3,733,133 | 5/1973 | Chapman | 350/285 |
| 3,916,536 | 11/1975 | Mohon et al. | 350/285 |
| 4,024,392 | 5/1977 | Teppo et al. | 350/301 |

Primary Examiner—Harvey E. Behrend
Attorney, Agent, or Firm—Donald J. Singer; Arsen Tashjian

[57] ABSTRACT

A laser beam pointing system, adapted for use in an aircraft. A preferred embodiment of the system includes: a laser beam source, within the aircraft, emitting a laser beam; and, a plurality of laser beam pointing devices in optical alignment with the laser beam. Each pointing device includes: a cylindrical shaped rotatable housing with a window, and either one or two rotatable optical means in optical alignment with the laser beam. One preferred arrangement is the mounting of one pointing device on the upper external surface of the aircraft fuselage, and of another pointing device on the lower external surface of the aircraft fuselage in a location oppositely disposed to and below the other pointing device, with the two pointing devices being in parallel relationship to each other, and with the pointing devices mounted flush with the aerodynamically configurated external surfaces of the fuselage. Another preferred arrangement is the mounting of one of the pointing devices on the leading edge of a left side fairing of the aircraft, and of another pointing device on the leading edge of the right side fairing of the aircraft angularly positioned with respect to the other pointing device, so that their respective axes are in the same plane and the axes would intersect if extended, and with the pointing devices mounted flush with the aerodynamically configurated leading edge of the respective fairings. This inventive system, unlike the prior art, permits the emitted laser beam to be projected over a broad range of angles with little or no aerodynamic interference with the aircraft on which it is mounted and used.

8 Claims, 13 Drawing Figures

LOW DRAG INTEGRATION OF LASER BEAM POINTING DEVICE INTO AIRCRAFT

STATEMENT OF GOVERNMENT INTEREST

The invention described herein may be manufactured and used by or for the Government for governmental purposes without the payment of any royalty thereon.

BACKGROUND OF THE INVENTION

This invention relates to a laser beam pointing system, as adapted in two preferred embodiments for mounting on an aircraft and for subsequent use in and with the aircraft, and more particularly to a laser beam pointing device which is a major component of the system.

In mounting a laser weapon in an aircraft, the emitted laser beam must be pointed at the target through optics (i.e., optical means) that are gimballed. To date, development effort has been placed on the turret concept, i.e., the use of a movable enclosure on an aircraft, in which enclosure some or all of the optics may be or are compactly contained. The results of the practical application of this concept to a laser weapon is that the movable optics container is spherical in shape, and is attached, by suitable means, on and external of the aircraft. The turret (i.e., the movable optics container) must be mounted sufficiently clear of the aircraft, so that the laser beam can be pointed over wide angles without intersecting either the aircraft or the turret-to-aircraft attaching means. The resultant gaps between the turret and the attaching (i.e., mounting) means can cause, and have caused, severe aerodynamic buffeting or interferences that drastically increase the aircraft drag and/or degrade the quality of the laser beam at the target.

My invention (which, in essence, eliminates the turret and the attaching means external of the aircraft) permits the emitted laser beam to be projected by and through the optics (i.e., the optical means) thereof over a broad range of angles with little or no aerodynamic interference with the aircraft concerned. I have, thereby, significantly advanced the state-of-the-art.

SUMMARY OF THE INVENTION

This invention relates to a novel laser beam pointing device, and variations thereof, as a major component of an aircraft laser beam pointing system.

The principal object of this invention is to teach an aircraft laser beam pointing system (together with the structure and the varied positioning of the laser beam pointing device components thereof) which obviates the drag and the beam degradation penalties that are inherent with the use of prior art aircraft laser beam pointers.

This principal object, and other equally important and related objects (such as teaching an aircraft laser beam pointing device which allows unencumbered scanning or sweeping of wide angular regions, and which similarly allows unencumbered pointing to targets within these regions), of this invention will become readily apparent after a consideration of the description herein of the invention and of its variations, coupled with reference to the drawings.

DESCRIPTION OF THE PRIOR ART

As a preliminary matter, it is to be noted that the phrases "optically aligned", "in optical alignment", and the like, are used herein in the interest of brevity; are intended to be synonymous and interchangeable; and, are intended to mean herein that the optical components (and/or other objects) referred to are in line with each other in the sense that they are in the path of the beam of light (or portion thereof) which is referred to and is being emitted, reflected, refracted, diffracted, diffused, transmitted, or the like. Stated another way, the components referred to may be, but need not be, in geometric alignment.

Figure 1:
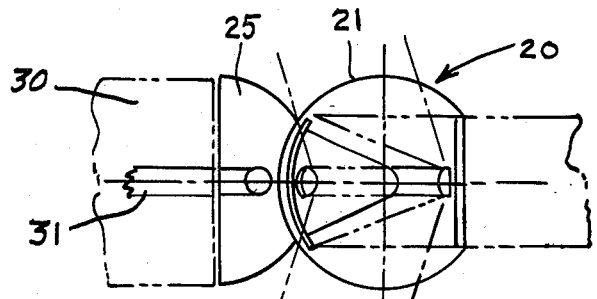
FIGS. 1-3, inclusive, are various views of a typical prior art aircraft laser beam pointing device, showing the application of the turret concept to the structure and positioning of the laser beam pointing device.
Figure 2:
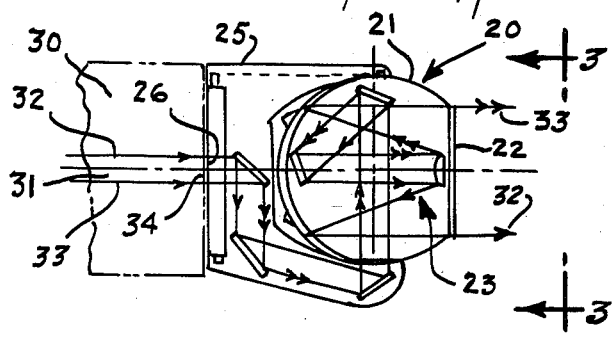
Figure 3:
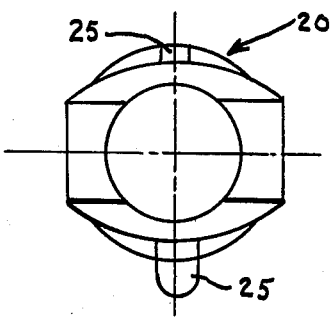

Now, with reference to FIGS. 1-3, inclusive, therein is shown, in various views, a typical prior art aircraft laser beam pointing device of the turret type 20.

More specifically, FIG. 1 is a top plan view, in simplified schematic form and partially in cross section, of the prior art laser beam pointing device 20, as mounted by attaching means 25 external of the aircraft 30 (such as at the nose thereof), with said aircraft 30 shown as fragmented in the interest of maintaining simplicity of the drawing.

FIG. 2 is a side elevation view, also in simplified schematic form and partially in cross section of the prior art laser beam pointing device 20, the attaching means 25, and the aircraft 30 on which the pointer 20 is mounted, which were shown in FIG. 1.

FIG. 3 is an end view of the pointer 20 and of the attaching means 25 shown in FIGS. 1 and 2, as viewed along lines 3—3 of FIG. 2.

Again, with reference to FIGS. 1-3, and most particularly to FIG. 2, laser beam 31 (wich representative edge rays 32 and 33) is generated by suitable means (i.e., a laser source) within aircraft 30; is directed to and through aircraft outlet 34, and into and through attachment means inlet 26; and, impinges upon, and is directed by, the optics 23 through the movable enclosure 21 (the turret), and through the opening 22 of the enclosure 21, to the target (not shown).

DESCRIPTION OF THE PREFERRED EMBODIMENT

Figure 4:
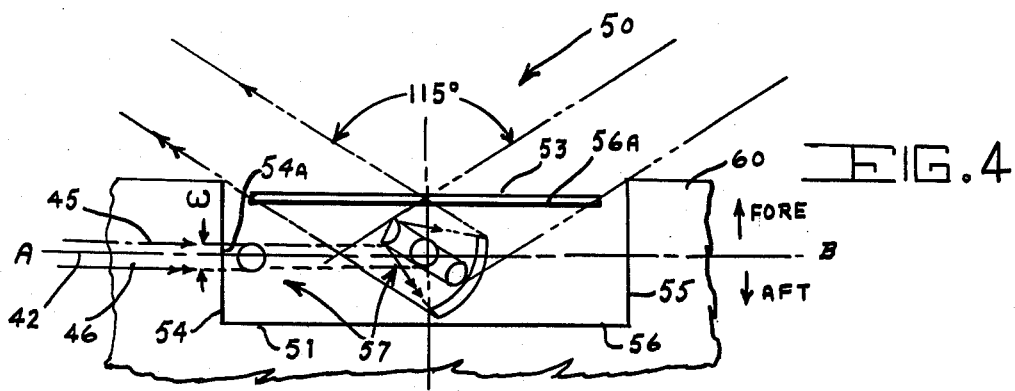
Figure 5:
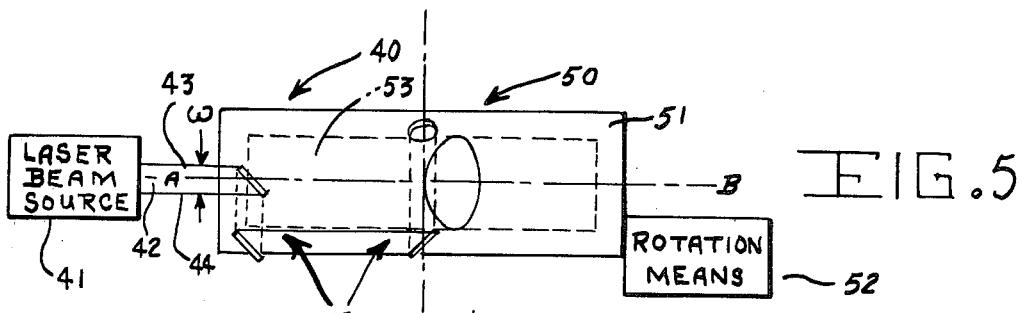
Figure 6:
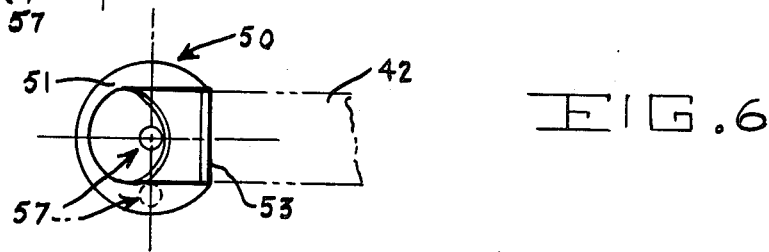

With reference to FIGS. 4-6, inclusive, therein is shown, in various views, a preferred embodiment of our inventive laser beam pointing system 40 and of the laser beam pointing device 50 thereof.

More specifically, FIG. 4 is a top plan view, in simplified schematic form and partially in cross section, of my laser beam pointer 50 component of my system 40. The pointer 50 is shown mounted on and in an aircraft 60, and is integrated therewith. The aircraft 60 is shown as fragmented in the interest of maintaining simplicity of the drawing. The directional designations "Fore" and "Aft" are denoted by legens and arrows, and are shown to orient the reader.

Figure 12:
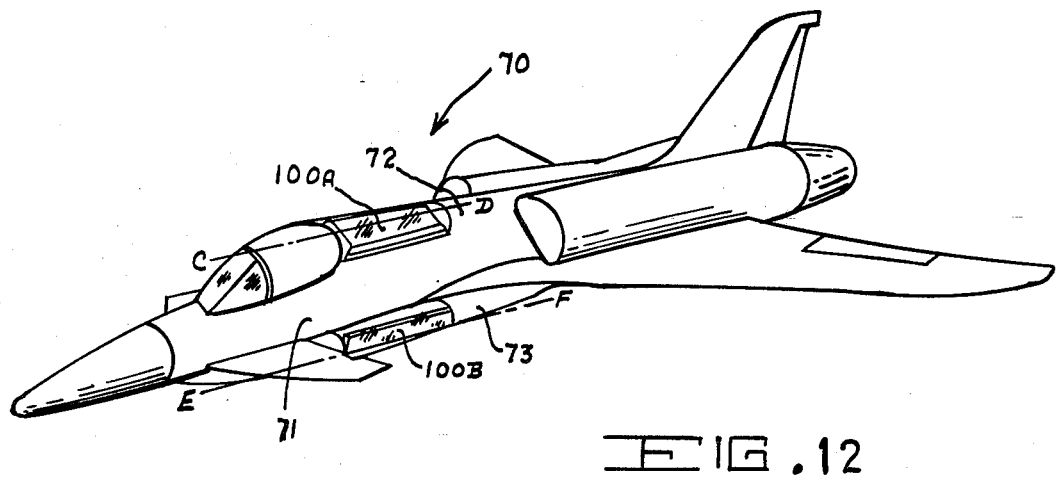
FIG. 12 is a perspective view of an aircraft showing one arrangement of preferred integrated mounting locations of two of my laser beam pointing devices.
Figure 13:
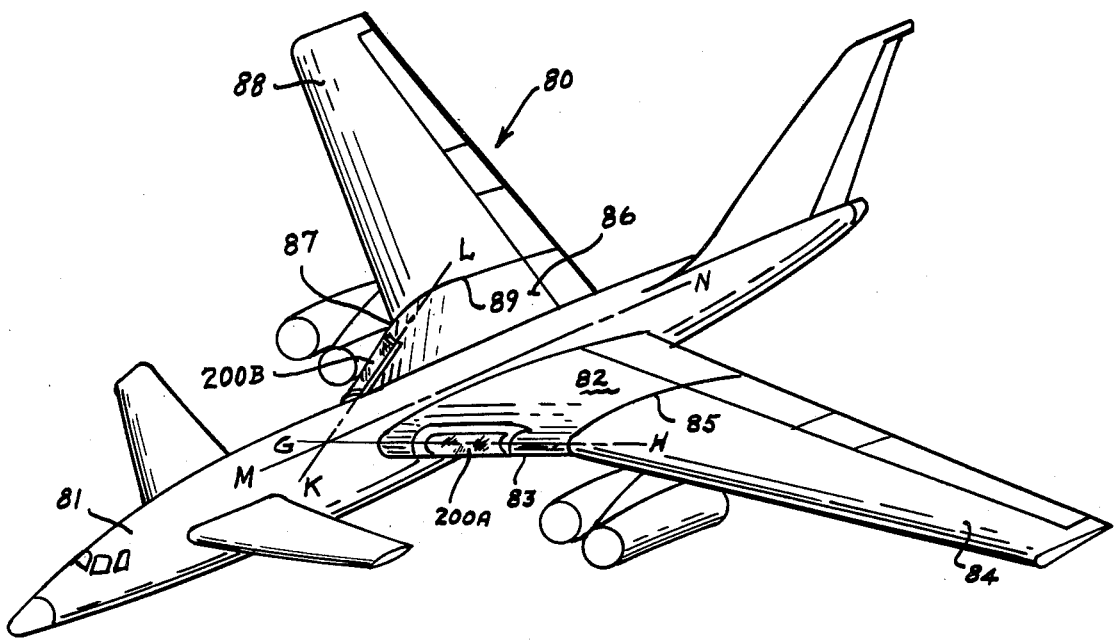
FIG. 13 is a perspective view of another aircraft showing another arrangement of preferred integrated mounting locations of another two of my laser beam pointing devices.

FIG. 5 is a side elevation view, also in simplified schematic form and partially in cross section, of my inventive laser beam pointing system 40, while it is not mounted on an aircraft. It is to be noted that my inventive system 40 comprises, in essence: a laser beam source 41 emitting a laser beam 42 having a predetermined width "W" and bounded by edge rays, such as 43 and 44; and, a plurality of our inventive laser beam pointers, such as representative one 50. Only one laser beam pointer 50 is shown in FIG. 5, rather than a plurality thereof, in the interest of maintaining simplicity of the drawing. However, a plurality (i.e., two) are shown in FIGS. 12 and 13 which will be discussed later herein. The laser beam source 41 is conventional.

FIG. 6 is an end view, also in simplified schematic form and partially in cross section, of our inventive pointer 50, which is shown in different views in FIGS. 4 and 5.

Now, with reference to FIGS. 4–6 (in which Figures the same reference numeral or character denotes the same component, element or the like), each laser beam pointer, such as representative one 50, of the plurality of such pointers, includes: a rotatable housing 51 preferably shaped in the form of a right circular cylinder or "drum"; means 52 for rotating said housing 51 operatively associated with the housing 51; a window 53 attached to the housing 51 at an opening 56A therein; and, at least one selectively rotatable optical means 57 (also referred to herein as "optics"), in optical alignment with the emitted laser beam 41, for directing the emitted laser beam 41 through the window 53 and out of the aircraft, such as 60.

The rotatable housing 51 has: a first end 54 with an opening 54A therein to permit the passage into the housing 51 of the emitted laser beam 41, a second end 55, and a cylindrical surface 56 with an opening 56A therein to permit the passage of the emitted laser beam 41 through the window 53, the housing 51, and out of the aircraft, such as 60. The housing 51 also has a horizontal axis A–B around which, or around part of which, the housing 51 may be rotated. As a matter of practicality, the housing 51 with the window 53 facing forwardly (see FIG. 4) is rotated around the housing axis 90 degrees each way (or, a total of 180 degrees), rather than being rotated completely around (or, a total of 360 degrees). Stated another way, it is preferred that the housing be rotated backward and forward between two points (i.e., oscillated), rather than being rotated all around.

The window 53 is flat; is made of material of suitable transmissive properties; and, the width of the window 53 must be at least the same as the width "W" of the laser beam 41 to be projected for pointing to the target.

Figure 7:
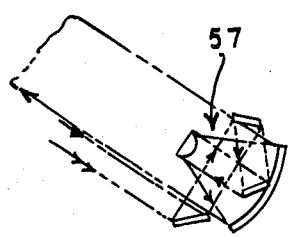
FIGS. 4-7, inclusive, are various views of a preferred embodiment of our inventive laser beam pointing system and laser beam pointing device thereof.

With reference to FIG. 7, therein is a true view of the optical means (i.e., "optics") 57 used in our invention. The optics 57 are of the telescopic type.

With reference to FIGS. 8–11, inclusive, there is shown, in different views, a variation 40A of the preferred embodiment of our inventive laser beam pointing system 40, and of the laser beam pointing devices thereof, such as representative pointer 50.

It is to be noted that in FIGS. 8–11, as well as in FIGS. 4–7, the same reference numeral or character denotes the same component, element, or the like.

Figure 8:
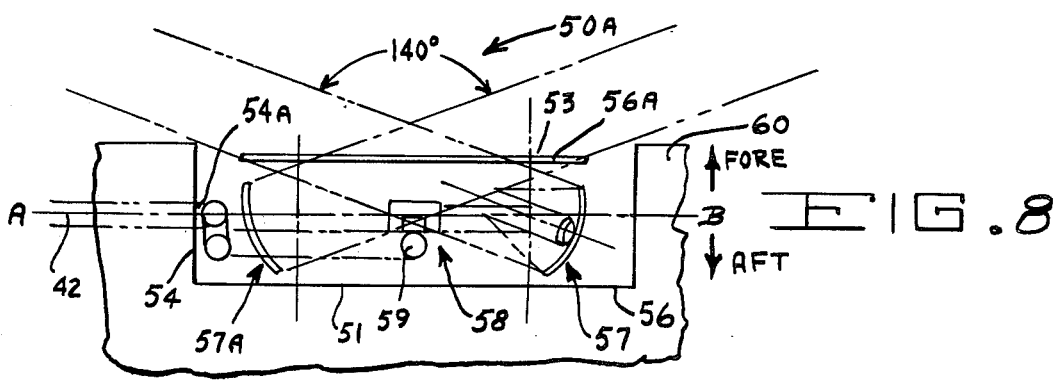
FIGS. 8-11, inclusive, are views of a variation of the preferred embodiment of our inventive laser beam pointing system and laser beam pointing device thereof.

FIG. 8 is a top plan view of the varied preferred embodiment of the laser beam pointer component 50A of the varied system 40A. This Figure should be compared with FIG. 4, particularly as to original laser beam pointer component 50 of original system 40.

Figure 9:
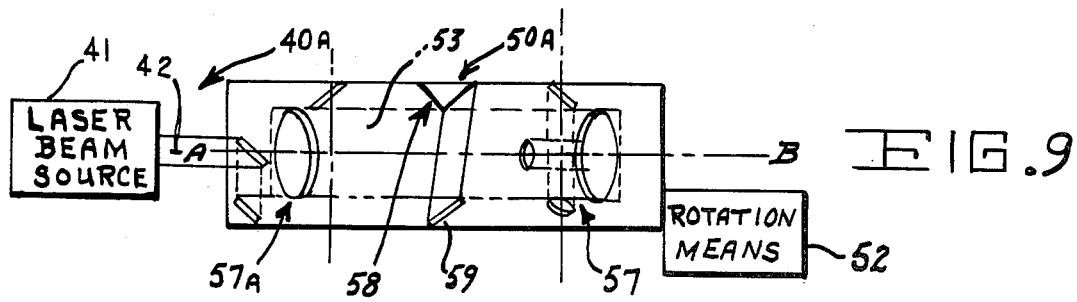

FIG. 9 is a side elevation view of the preferred embodiment of the varied system 40A. This Figure is to be compared with FIG. 5, particularly as to original system 40 therein.

Figure 10:
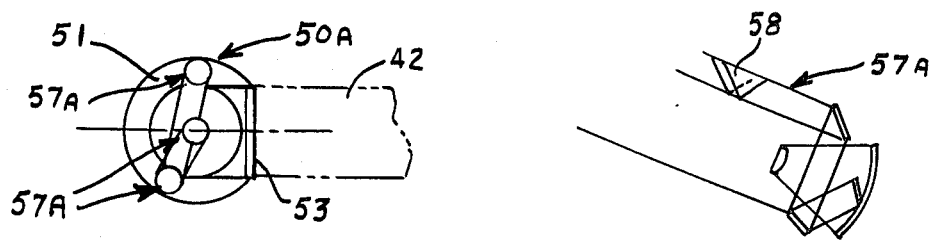

FIG. 10 is an end view of the preferred embodiment of the varied laser beam pointer 50A. This Figure should be compared with FIG. 6.

Figure 11:
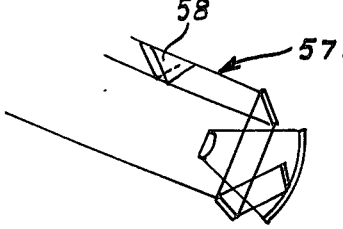

FIG. 11 will be discussed later herein.

All of these views, FIGS. 8–11, are in simplified schematic form and partially in cross section.

As a result of this comparison, it is readily apparent that the significant structural differences between the preferred embodiment of the original system 40 and of the variation thereof 40A are in the structure of their respective laser beam pointers, such as 50 and 50A. More specifically the varied pointer 50A differs from the original pointer 50 in that in 50A two optical means, such as 57 and 57A, are used (rather than the one optical means 57 in pointer 50) with the two optical means 57 and 57A being located in the same housing or "drum" 51, and also in that a switching means, such as 58, for selecting for use either of the two optical means 57 and 57A, is added to and is used in housing 51. The switching means 58 is operatively associated with optical means 57 and 57A, and includes a movable reflector 59, such as a mirror.

With reference to FIG. 11, therein is shown a true view of the varied optical means 57A used in the variation 50A of the, original beam pointer 50, together with a portion of switching means 58.

Now, with reference to FIGS. 12 and 13, therein are shown, in perspective view, aircraft 70 and 80, with each showing a different arrangement of the locations therein that are preferred for mounting and integrating the plurality of beam pointers, original 50 or varied 50A.

More specifically, and with reference to FIG. 12, therein is shown an aircraft 70 with an aerodynamically configured fuselage 71 having an upper external surface 72 and a lower external surface 73 which are also aerodynamically configured. A first laser beam pointing device 100A, identical either to the original laser beam pointing device 50 or to the variation thereof 50A and having a centrally located horizontal rotation axis C–D, is positioned in the upper external surface 72 of the fuselage 71 of the aircraft 70, and is mounted thereat flush with the aerodynamically configured fuselage 71 and with the upper external surface 72 thereof. A second laser beam pointing device 100B, preferably identical to 100A, and having a centrally located horizontal rotation axis E–F, is positioned in the lower external surface 73 of the fuselage 71 and directly below (i.e., oppositely dispose to) the mounted first laser beam pointing device 100A, and is mounted thereat flush with the aerodynamically configured fuselage 71 and lower external surface 73, with its rotation axis E–F essentially parallel to rotation axis A–B of laser beam pointer 100A.

More specifically, and with reference to FIG. 13, therein is shown an aircraft 80 with an aerodynamically configurated fuselage 81 and having a left side fairing 82 with a leading edge 83, a left wing 84 with a wing root 85, a right side fairing 86 with a leading edge 87, and a right wing 88 with a wing root 89, all of which also are aerodynamically configurated. A third laser beam pointing device 200A, identical either to the original laser beam pointing device 50 or to the variation thereof 50A, and having a centrally located horizontal axis G–H, is positioned in the leading edge 83 of the left side fairing 82 of the aircraft 80, and is mounted thereat flush with the aerodynamically configurated leading edge 83 of the left side fairing 82.

Still with reference to FIG. 13, a fourth laser beam pointing device 200B, preferably identical to 200A, and having a centrally located horizontal rotation axis K–L, is positioned in the leading edge 87 of the right side fairing 86 of the aircraft 80, and is mounted thereat flush with the aerodynamically configurated leading edge 87 of the right side fairing 86, and with the rotation axis K–L in the same plane as, and angularly positioned with relationship to, the rotation axis G–H of the third laser beam pointing device 200A. Stated another way, the third and fourth pointers 200A and 200B are positioned so that their respective axes G–H and K–L would intersect, if extended.

MANNER OF OPERATION OF THE PREFERRED EMBODIMENTS

The manner of operation of the preferred embodiments of the inventive laser beam pointing system 40 and 40A and of the inventive laser beam pointer component 50, 50A, 100A, 100B, 200A and 200B, is readily ascertainable, and is easily understandable, from the foregoing description, coupled with reference to the Figures of the drawing, by a person of ordinary skill in the art, so that no explanation here is deemed necessary.

However, with regard to the preferred arrangement of the inventive pointers of the system, as used on and in aircraft, such as is shown in FIGS. 12 and 13, it is believed pertinent to point out the following:

One pointer, such as 50, FIG. 4, is capable of rotating about axis A–B 90 degrees each way for a total of 180 degrees. However, if two of these pointers are used and are arranged as is shown in 12, total coverage that can be swept by the pointer (and, of course, by the laser beam) is 84 percent full spherical. The only area not covered by the pointer and the projected beam is a cone at the nose and tail having a 32½ degree half angle.

If the pointers used in this arrangement are of the structure of the other preferred embodiment 50A, FIG. 8, the laser field of fire can be increased without increasing the size of either the housing (of the pointer) or of the window (of the housing). By use of the switching means 58, FIG. 8, the laser beam can be directed (or "switched") to either of the two optical means 57 or 57A, thereby permitting to increase to 140 degrees. Thus, the field of fire is increased to 94 percent full spherical with a nose and tail "blind area" reducing to a cone of 20 degrees half angle.

If two pointers structured such as 50 are used in the arrangement shown in FIG. 13, then more forward coverage is provided, as compared to when two pointers structured such as 50 are used in the arrangement shown in FIG. 12. With reference to FIG. 13, if the axis of each pointer is 25 degrees to the centerline M–N of fuselage 81, then the forward area that is not covered is reduced to an elliptical cone of 15 degrees horizontal by 65 degrees vertical.

CONCLUSION

It is abundantly clear from all of the foregoing, and from the drawings herein, that the hereinbefore stated principal object has been attained. In addition, related desirable objects also are, have been, and can be attained.

It is to be noted that, although there have been described the fundamental and unique features of our invention as applied to certain preferred embodiments, various other embodiments, adaptations, additions, omissions, substitutions, and the like will occur to, and can be made by, those of ordinary skill in the art, without departing from the spirit of our invention. For example: the system may be varied to include a plurality of laser beam sources, with a laser beam source for each one of the plurality of laser beam pointing devices.

What is claimed is:

1. A laser beam pointing system, adapted for use in an aircraft having a fuselage with an upper external surface and a lower external surface, a left side fairing with a leading edge, a left wing with a wing root, a right side fairing with a leading edge, and a right wing with a wing root, wherein said left side fairing blends into said root of said left wing, and said right side fairing blends into said root of said right wing, and wherein said fuselage, said external surfaces of said fuselage, said fairings, and said wings, with roots are all aerodynamically configurated, comprising:
   a. a laser beam source, internal of said aircraft, emitting a laser beam of predetermined width;
   b. and, a plurality of laser beam pointing devices, wherein each one of said pointing devices of said plurality includes:
   (1) a rotatable housing shaped in the form of a right circular cylinder having a first end with an opening therein to permit the passage into said housing of said emitted laser beam, a second end, and a cylindrical surface with an opening therein to permit the passage of the emitted laser beam out of said housing and out of said aircraft, and with said housing also having a horizontal axis, around which said housing is selectively rotatable;
   (2) means for rotating said housing operatively associated with said housing;
   (3) a window positioned in, and attached to, said housing at said opening in the cylindrical surface of the rotatable housing, wherein said window is of dimensions to permit the transmission therethrough of the emitted laser beam of predetermined width;
   (4) and, at least one selectively rotatable optical means, in optical alignment with the emitted laser beam, and positioned within and attached to said rotatable housing, for directing said emitted laser beam through said window and out of said aircraft;

wherein each one of said plurality of laser beam pointing devices is mounted on and in said aircraft, and is integrated with the aircraft to conform to the aerodynamic configuration of the aircraft.

2. A laser beam pointing system, as set forth in claim 1, wherein said plurality of laser beam pointing devices comprises a first laser beam pointing device having a centrally located horizontal rotation axis, and a second laser beam pointing device having a centrally located horizontal rotation axis, with said first laser beam pointing device positioned in the upper external surface of said fuselage of said aircraft, and with said second laser beam pointing device positioned in the lower external surface of said fuselage in a location oppositely disposed and below said first laser beam pointing device, with said rotation axis of said second beam laser pointing device parallel to said rotation axis of said first laser beam pointing device, and with said first and second laser beam pointing devices mounted flush with said aerodynamically configured fuselage, and said external surfaces, of said aircraft.

3. A laser beam pointing system, as set forth in claim 1, wherein said plurality of laser beam pointing devices comprises a third laser beam pointing device having a centrally located horizontal rotation axis, and a fourth laser beam pointing device having a centrally located horizontal rotation axis, with said third laser pointing device positioned in the leading edge of the left side fairing of said aircraft, and with said fourth laser pointing device positioned in the leading edge of the right side fairing of the aircraft, with said rotation axis of said fourth laser beam pointing device in the same plane as, and angularly positioned with relationship to, said rotation axis of said third laser beam pointing device, and with said third and fourth laser beam pointing devices mounted flush with said aerodynamically configurated leading edges of, respectively, the left and the right side fairings of the aircraft.

4. A laser beam pointing system, as set forth in claim 1, wherein said laser beam pointing device includes two of said selectively rotatable optical means which are operatively associated with a switching means for selecting for use either one of said two rotatable optical means.

5. A laser beam pointing system, as set forth in claim 2, wherein said first and said second laser pointing devices each include two of said selectively rotatable optical means which are operatively associated with a switching means for selecting for use either one of said two rotatable optical means.

6. A laser beam pointing system, as set forth in claim 3, wherein said third and fourth laser pointing devices each include two of said selectively rotatable optical means which are operatively associated with a switching means for selecting for use either one of said two rotatable optical means.

7. A laser beam pointing system, as set forth in claim 4, wherein said switching means includes a movable reflector.

8. A laser beam pointing system, as set forth in claim 7, wherein said reflector is a mirror.

* * * * *